United States Patent Office 2,822,164
Patented Feb. 4, 1958

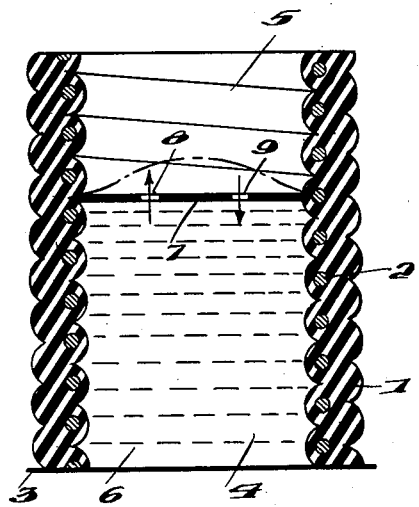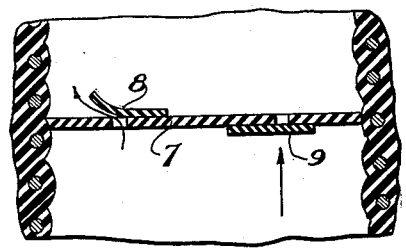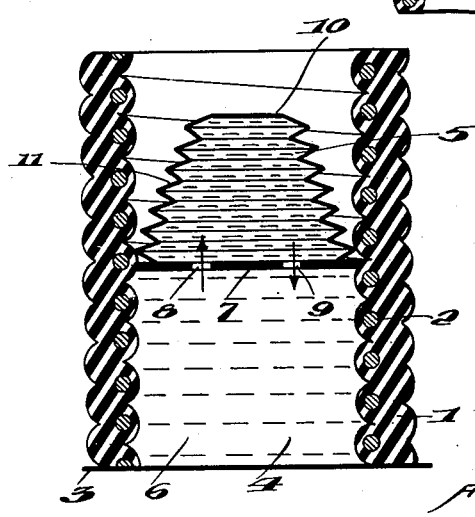

2,822,164

FLUID MOVEMENT SHOCK ABSORBERS WITH SPRINGS OF RUBBER-METAL

Antonio Boschi, Milan, Italy, assignor to Società Applicazioni Gomma Antivibranti S. A. G. A. Società per Azioni, Milan, Italy Application October 15, 1954, Serial No. 462,464

Claims priority, application Italy February 10, 1954

2 Claims. (Cl. 267—8)

This invention relates to impact sustaining elements, and, more particularly, to combination spring-fluid shock absorbers.

One common type of shock absorber includes a spring element mounted between two relatively movable members, and a fluid damper to oppose and damp out flexures of the spring element. The spring may be any resilient member, such as the usual steel coiled or leaf spring, or a combination of rubber and metal. The damping fluid may be oil, or any other relatively incompressible liquid.

In such shock absorbers, the damping fluid is usually held in a deformable chamber within the spring element and passes from the deformable chamber into a second chamber during compression of the spring. The second chamber may be external of the spring or may be mounted within the spring element, and usually has a constant volume defined by a rigid container.

If the second chamber is external of the spring element, the added space taken up by the chamber constitutes a disadvantage, while if the chamber is contained within the spring element, the rigid container interferes with the operation of the spring to such an extent that additional elements may be required to obtain rectilinear movement of the spring.

The present invention avoids the disadvantage of the prior proposals by providing a pair of chambers for damping fluid within the spring element, the wall between the two chambers being a flexible partition secured to the walls of the spring element. The partition may be a rubber diaphragm carrying the usual valves to permit fluid flow through the diaphragm between the two chambers.

The invention will now be more fully described in conjunction with the accompanying drawing, showing preferred embodiments of the invention.

In the drawing:

Fig. 1 is a diagrammatic view of a shock absorber constructed in accordance with the invention;

Fig. 2 is a diagrammatic view similar to Fig. 1, showing the use of a deformable member to define the volume of the second chamber for damping fluid; and Fig. 3 is a diagrammatic view illustrating conventional flap valves for controlling the openings through the flexible partition.

The shock absorber of the drawing includes the usual spring element 1, here shown as of the helical rubber-metal type, having a steel coiled spring 2 embedded in the helical rubber body. Though this type of spring is preferred, it is obvious that many other types of spring elements could be used.

The inner wall of the spring element 1, together with the lower end wall 3, defines a space 4 for damping fluid, preferably oil or some other suitable incompressible liquid.

The space 4 is divided into upper and lower chambers 5 and 6, respectively, by a flexible disc-shaped partition 7, which is preferably a rubber diaphragm. The partition is attached directly to the inner wall of the spring element 1, but may be removably attached, so as to permit adjustment of the partition upwardly and downwardly within the spring. The partition may be permanently affixed to the spring element and may be molded with the spring element, during formation of the latter. The partition may also be of a different type of rubber than the spring element, to obtain any desired characteristics for the shock absorber.

The partition or diaphragm 7 carries inlet and return valves 8 and 9, respectively, to permit damping fluid to exit from chamber 6 into chamber 5 during compression of the spring element, and to permit the fluid to return from chamber 5 to chamber 6 during opposite movement of the spring.

Fig. 3 shows conventional flap valves for controlling the inlet and return valve openings 8 and 9. One of these valves is shown in open position and the other in closed position, since obviously both valves cannot be open at the same time.

It will be obvious that the simplified construction of the shock absorber of Fig. 1 is advantageous in itself, but also that arcuate flexure of the spring element during action of the shock absorber is permitted through use of this construction. Another important advantage of the construction of the invention stems from the fact that, as shown by the dotted-line position of the diaphragm in Fig. 1, the damping action of the fluid is exerted on the portion of the spring element on the "valley" or concave side of the diaphragm, so that the diaphragm acts as an additional resilient element in series with the damper provided by the damping fluid.

The apparatus of Fig. 2 is identical with that of Fig. 1, except that it additionally incorporates a deformable member to define the upper chamber of the shock absorber, as suggested in my co-pending application Serial Number 462,463, filed October 15, 1954.

The deformable member comprises a rubber container 10 having an accordion-like side wall 11, and has its lower end attached to diaphragm 7, as by vulcanization. Consequently, the upper surface of the diaphragm and the inner walls of the deformable container define the chamber 6. Both chambers 5 and 6 may be filled with damping fluid, so that no air can mix with the fluid during flexures of the spring element to form the objectionable fluid-air emulsions described in my aforesaid application. During compression of the spring, fluid is forced from chamber 6 into chamber 5, and deformable container 10 expands to enlarge chamber 5 for this added volume of fluid. The reverse action takes place on extension of the spring.

It will be obvious that the spring element, diaphragm, and deformable container of Fig. 2 could be molded in one piece, if desired. It is also obvious that many changes could be made in the apparatus specifically described herein, without departure from the scope of the invention. Accordingly, the invention is not to be considered limited to the specific embodiments described, but only by the appended claims.

I claim:

1. A shock absorber comprising a spring element having an inner wall defining a substantially cylindrical space, a flexible diaphragm conforming in shape to the cross-section of said space and fixed to the inner wall of the spring element, said diaphragm dividing said space into a pair of chambers, means including the inner wall of the spring defining the side and one end wall of one of said chambers, a pressure-deformable container having its open end fixed to the side of the diaphragm opposite that facing said one chamber, the inner surface of said deformable container and said side of the diaphragm defining the other of said chambers, both of said chambers being substantially filled with an incompressible liquid, 2. A shock absorber comprising a spring element having a body of resilient material having a length diminished by related pressure between its opposite ends, said body having internal wall means extending along its length defining an internal space for damping fluid, and a flexible partition dividing the space into two chambers for said fluid, one of said chambers being substantially filled with said fluid, said partition having means thereon for permitting fluid flow between said two chambers, said damping fluid being a substantially incompressible liquid, said internal space being substantially cylindrical, said partition being a substantially circular rubber disc conforming to the cross-section of the internal space, said means for permitting fluid flow comprising a pair of oppositely-acting one-way valves, and said disc being distorted during compression of the spring element to expose its concave side to the chamber substantially filled with fluid.

References Cited in the file of this patent

UNITED STATES PATENTS

| | | |
|---|---|---|
| 2,103,946 | Herr | Dec. 28, 1937 |
| 2,605,099 | Brown | July 29, 1952 |

FOREIGN PATENTS

| | | |
|---|---|---|
| 730,271 | Germany | Jan. 8, 1943 |
| 751,475 | France | June 19, 1933 |
| 792,738 | France | Oct. 28, 1935 |